US006986377B2

(12) United States Patent
Johnson et al.

(10) Patent No.: US 6,986,377 B2
(45) Date of Patent: Jan. 17, 2006

(54) METHOD AND APPARATUS FOR GUIDING AND SEALING SPLIT-FLANGE ZIPPER TAPE TO BAG MAKING FILM

(75) Inventors: Joel L. Johnson, Stockbridge, GA (US); Ronald Cortigiano, Sr., Toccoa, GA (US)

(73) Assignee: Illinois Tool Works Inc., Glenview, IL (US)

( * ) Notice: Subject to any disclaimer, the term of this patent is extended or adjusted under 35 U.S.C. 154(b) by 423 days.

(21) Appl. No.: 10/262,087

(22) Filed: Sep. 30, 2002

(65) Prior Publication Data

US 2004/0060638 A1 Apr. 1, 2004

(51) Int. Cl.
*B30B 15/00* (2006.01)

(52) U.S. Cl. .................... 156/581; 156/583.1; 493/213

(58) Field of Classification Search .................. 156/66, 156/459, 461, 522, 553, 554, 580, 581, 583.1; 493/189, 193, 194, 195, 213, 214, 224
See application file for complete search history.

(56) References Cited

U.S. PATENT DOCUMENTS

| | | | | |
|---|---|---|---|---|
| 3,853,671 | A | 10/1974 | Ausnit | 156/580 |
| 5,096,516 | A * | 3/1992 | McDonald et al. | 156/66 |
| 5,334,127 | A * | 8/1994 | Bruno et al. | 493/194 |
| 6,732,898 | B2 * | 5/2004 | Cortigiano, Sr. | 226/190 |
| 6,733,622 | B2 * | 5/2004 | McMahon et al. | 156/580.2 |
| 6,743,330 | B2 * | 6/2004 | Crevier | 156/580.2 |
| 6,780,263 | B2 * | 8/2004 | Delisle | 156/64 |
| 6,810,641 | B2 * | 11/2004 | Ausnit | 53/412 |

* cited by examiner

*Primary Examiner*—James Sells
(74) *Attorney, Agent, or Firm*—Ostrager Chong Flaherty & Broitman P.C.

(57) ABSTRACT

A method and an apparatus for sealing a split-flange zipper tape in a center fold of a web of bag making film without sealing or tacking the two sides of the split zipper web together.

17 Claims, 8 Drawing Sheets

METHOD AND APPARATUS FOR GUIDING AND SEALING SPLIT-FLANGE ZIPPER TAPE TO BAG MAKING FILM

BACKGROUND OF THE INVENTION

This invention generally relates to slider-operated flexible zippers for use in reclosable pouches, bags or other packages of the type in which material, such as foodstuff, detergent, etc., may be stored.

Reclosable fastener assemblies are useful for sealing thermoplastic pouches or bags. Such fastener assemblies often include a plastic zipper and a slider. Typically, the plastic zippers include a pair of interlockable fastener elements, or profiles, that form a closure. As the slider moves across the profiles, the profiles are opened or closed. The profiles in plastic zippers can take on various configurations, e.g. interlocking rib and groove elements having so-called male and female profiles, interlocking alternating hook-shaped closure elements, etc.

Conventional slider-operated zipper assemblies typically comprise a plastic zipper having two interlocking profiles and a slider for opening and closing the zipper. In one type of slider-operated zipper assembly, the slider straddles the zipper and has a separating finger at one end that is inserted between the profiles to force them apart as the slider is moved along the zipper in an opening direction. The other end of the slider is sufficiently narrow to force the profiles into engagement and close the zipper when the slider is moved along the zipper in a closing direction. Other types of slider-operated zipper assemblies avoid the use of a separating finger. For example, U.S. Pat. No. 6,047,450 discloses a zipper comprising a pair of mutually interlockable profiled structures, portions of which form a fulcrum about which the profiled structures may be pivoted out of engagement when lower edges of the bases are forced towards each other by the moving slider.

Reclosable bags are finding ever-growing acceptance as primary packaging, particularly as packaging for foodstuffs such as cereal, fresh vegetables, snacks and the like. Such bags provide the consumer with the ability to readily store, in a closed, if not sealed, package any unused portion of the packaged product even after the package is initially opened. To gain acceptance as a primary package for foodstuffs, it is virtually mandatory that the package exhibit some form of tamper evidence to protect the consumer and maintain the wholesomeness of the contained product. In addition, in many cases it is necessary that food product be hermetically packaged. This may readily be accomplished by forming a plastic bag of a film having the appropriate barrier properties. However, where the bag is provided with a zipper, a problem arises in properly sealing the bag at the opening to be closed by the zipper, since the zipper itself does not provide a hermetic seal.

A resealable package that exhibits tamper evidence and can be hermetically sealed is disclosed in U.S. Pat. No. 6,354,738. The invention disclosed therein makes use of a strip having capped perforations or another form of weakening in a unique bag configuration. A bag is provided having front and rear walls joined along the bottom and sides and open at the top. A zipper is provided at the bag top having first and second zipper halves that include interlocking profiled closure members designed to interlock with each other. Each zipper half comprises a respective flange, each flange extending from below the respective profiled closure member toward the bag interior. The flanges are of unequal size with the shorter flange being sealed directly to one (first) bag wall. The longer flange is sealed to the other (second) bag wall and to the first bag wall below the point at which the shorter flange is sealed to the first bag wall. A line of weakening, such as a capped line of perforations of the type disclosed in U.S. Pat. No. 5,023,122, is provided in the longer flange between the locations at which it is sealed to the two opposing bag walls. The capped line of perforations or other line of weakening weakens the zipper flange so that it may be readily ruptured, without detracting from the barrier property of the zipper flange until rupturing actually occurs.

FIG. 6 of U.S. Pat. No. 6,354,738 shows a zipper having a so-called "split flange", which name is derived from the fact that zippers of this tape can be manufactured by "splitting" a continuous web to form flanges. More specifically, such zipper tape is formed by extruding a pair of profiled closure members with a connecting membrane therebetween, forming a line of weakened tear resistance near the center line of the connecting membrane, interlock the closure members and causing the connecting web to fold at the line of weakening, and then cutting or splitting the membrane on one side to form a short flange and a long flange, the latter having a generally V-shaped portion with the cusp at the line of weakening. Alternatively, the two zipper profiles of a split-flange zipper can be extruded separately, instead of being extruded as one piece and then cut. The split condition of the zipper flange results in faster and more consistent winding of the zipper on a spool as compared to the situation when the zipper has a continuous flange.

It has been proposed to install a split-flange zipper in a center fold of bag making film and then fill the resulting package from the bottom. There is a need for a method and an apparatus for guiding and sealing a split-flange zipper to bag making film without sealing or tacking the two sides of the split zipper web together.

BRIEF DESCRIPTION OF THE INVENTION

The present invention is directed to a method and an apparatus for sealing a split-flange zipper tape in a center fold of a web of bag making film without sealing or tacking the two sides of the split zipper web together.

One aspect of the invention is an apparatus for sealing an inverted zipper tape to a generally vertical section of a web of bag making film, the zipper tape comprising a first profiled closure element, a first zipper flange connected to the first closure member and having a distal edge, a second profiled closure element that is interlockable with the first closure element, and a second zipper flange connected to the second closure element, folded at a cusp, and having a distal edge confronting and separated by a gap from the distal edge of the first zipper flange. The apparatus comprises: a generally vertical mounting plate comprising a terminal section disposed between the vertical section of the web and an adjacent section of the zipper tape; a generally horizontal flange connected to the terminal section of the mounting plate and projecting through the gap; a generally vertical separator blade comprising an end section connected to the flange and a cantilevered section projecting in a longitudinal direction, the separator blade comprising a lower portion that separates the first zipper flange from an opposing portion of the second zipper flange and an upper portion that separates mutually opposing portions of the second zipper flange from each other; and a pair of jaws disposed on opposing sides of the cantilevered section of the separator blade and movable between respective extended and retracted positions, the zipper tape and the web of bag making film being pressed together when the jaws are in the extended positions.

Another aspect of the invention is a method of attaching a zipper tape in a folded web of bag making film, comprising the following steps: (a) extending a web of bag making film in a machine direction; (b) placing a zipper tape on the web of bag making film, the zipper tape being generally aligned in the machine direction, the zipper tape comprising a first profiled closure element, a first zipper flange connected to the first closure member and having a distal edge, a second profiled closure element that is interlockable with the first closure element, and a second zipper flange connected to the second closure element, folded at a cusp, and having a distal edge confronting and separated by a gap from the distal edge of the first zipper flange; (c) joining a first portion of the second zipper flange to the web of bag making film in a first zone of joinder; (d) folding the web of bag making film so that first and second portions of the web extend upward from the fold with the zipper tape sandwiched therebetween, the fold being placed so that the first zone of joinder is on the first portion of the web; (e) substantially thermally isolating the first portion of the second zipper flange from a second portion of the second zipper flange that opposes the first portion of the second zipper flange; and (f) joining the second portion of the second zipper flange to the second portion of the web in a second zone of joinder by directing thermal energy toward the second portion of the second zipper flange while the first portion of the second zipper flange is substantially thermally isolated therefrom.

A further aspect of the invention is an apparatus for in-line sealing of zipper tape to film comprising: first and second jaws disposed on opposing sides of a vertical plane and movable between respective extended and retracted positions; a generally vertical mounting plate disposed generally parallel to the vertical plane, the mounting plate having a terminal section; a generally horizontal flange connected to the terminal section of the mounting plate and projecting on one side of the mounting plate; and a generally vertical separator blade disposed generally parallel to the vertical plane, and comprising an end section connected to the flange and a cantilevered section connected to the end section and projecting in a direction of zipper tape/web advancement. The separator blade has a top edge at a first height and a bottom edge at a second height. The first height is above a height of the flange connected to the mounting plate and the second height is below the height of the flange. The jaws confront opposing sides of the cantilevered section of the separator blade.

Another aspect of the invention is a method for manufacturing resealable packages, comprising the following steps: (a) cutting a folded zipper web that connects interlocked closure members of a zipper tape along one side of the zipper web to form a split-flange zipper tape comprising a longitudinal gap on one side of the zipper web and no longitudinal gap on the other side of the zipper web; (b) placing the split-flange zipper tape in contact with a web of bag making film in a predetermined position parallel and proximal to a line where the web of bag making film will be folded, the side of the zipper web having no longitudinal gap contacting the web of bag making film; (c) sealing the side of the zipper web having no longitudinal gap to the web of bag making film in a first longitudinal zone of joinder while the zipper tape is in the predetermined position; (d) folding the web of bag making film along the line until the zipper tape is sandwiched between opposing first and second portions of the web of bag making film, the zipper tape being sealed to only the first portion of the web of bag making film at this juncture; (e) substantially thermally isolating the side of the zipper web having the longitudinal gap from the side of the zipper web having no longitudinal gap; (f) sealing the side of the zipper web having the longitudinal gap to the second portion of the web of bag making film in a second longitudinal zone of joinder while the side of the zipper web having no longitudinal gap is substantially thermally isolated therefrom; (g) sealing the web of bag making film along first and second transverse zones of joinder; and (h) cutting the web of bag making film and the zipper tape along transverse lines in the first and second transverse zones of joinder respectively.

Yet another aspect of the invention is a machine for in-line manufacture of resealable packages, comprising: means for placing a split-flange zipper tape in contact with a web of bag making film in a predetermined position parallel and proximal to a line where the web of bag making film will be folded, the split-flange zipper tape comprising a folded and cut zipper web that connects interlocked closure members of the zipper tape, one side of the zipper web having a longitudinal gap and the other side of the zipper web having no longitudinal gap, the latter contacting the web of bag making film; means for sealing the side of the zipper web having no longitudinal gap to the web of bag making film in a first longitudinal zone of joinder while the zipper tape is in the predetermined position; means for folding the web of bag making film along the line until the zipper tape is sandwiched between opposing first and second portions of the web of bag making film, the zipper tape being sealed to only the first portion of the web of bag making film at this juncture; means for substantially thermally isolating the side of the zipper web having the longitudinal gap from the side of the zipper web having no longitudinal gap; means for sealing the side of the zipper web having the longitudinal gap to the second portion of the web of bag making film in a second longitudinal zone of joinder while the side of the zipper web having no longitudinal gap is substantially thermally isolated therefrom; means for sealing the web of bag making film along first and second transverse zones of joinder; and means for cutting the web of bag making film and the zipper tape along transverse lines in the first and second transverse zones of joinder respectively.

Other aspects of the invention are disclosed and claimed below.

DETAILED DESCRIPTION OF THE INVENTION

Figure 1:
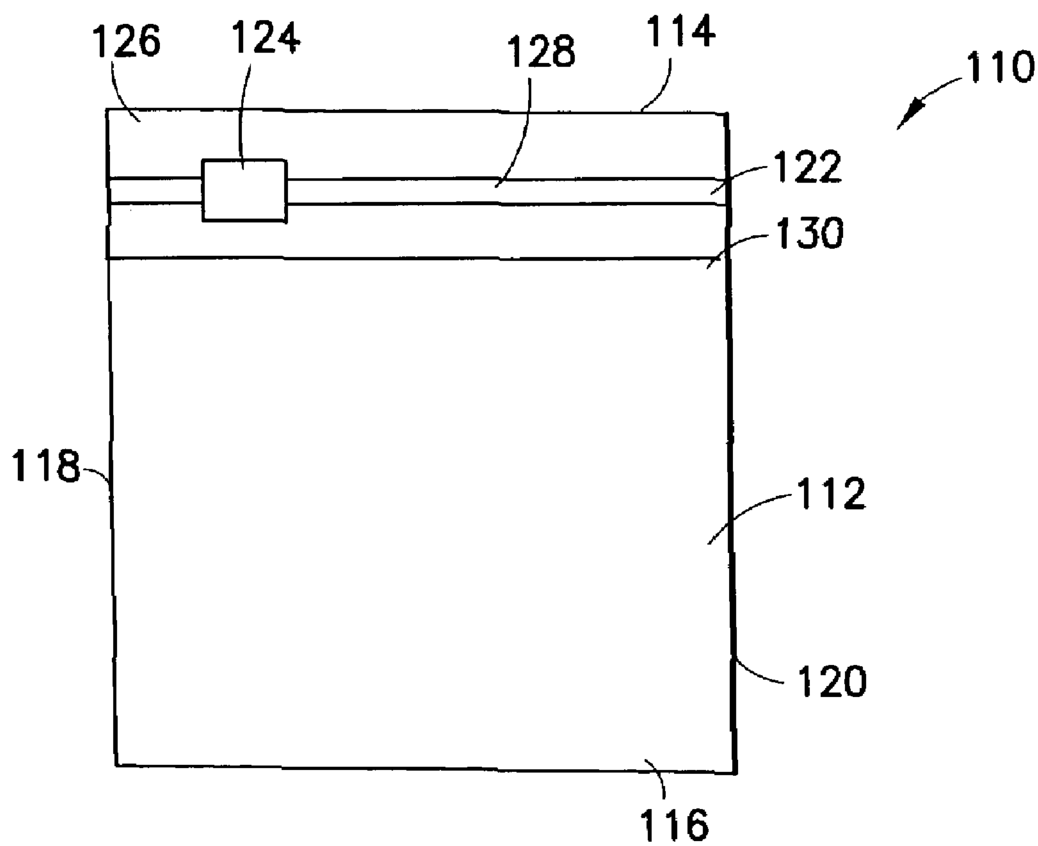
FIG. 1 is a drawing showing a front view of a typical resealable package having a slider/zipper assembly.

Reference will now be made to the drawings in which similar elements in different drawings bear the same reference numerals. FIG. 1 depicts a resealable package or bag 110 comprising a front wall 112 and a rear wall (not visible in FIG. 1) behind and opposite the front wall 112. The package further has a top 114, a bottom 116, and left and right sides 118, 120. In one type of package, the bottom 116 comprises a fold in the web material forming the front and rear walls and sides 118, 120 each comprise a side seal formed in the overlapping side edges of the front and rear walls. In another type of package, the bottom 116 comprises a bottom seal formed in the overlapping bottom edges of the front and rear walls and sides 118, 120 each comprise a side seal formed in the overlapping side edges of the front and rear walls. In yet another type of package, the bottom 116 comprises a bottom wall contiguous with the front and rear walls and sides 118, 120 each comprise a side seal as previously described. The front, rear and bottom walls comprise thermoplastic web material or film. The bag walls or walls may be formed of various types of thermoplastic material, such as low-density polyethylene, substantially linear copolymers of ethylene and a C3–C8 alpha-olefin, polypropylene, polyvinylidene chloride, mixtures of two or more of these polymers, or mixtures of one of these polymers with another thermoplastic polymer. The person skilled in the art will recognize that this list of suitable materials is not exhaustive. The preferred thermoplastic materials are polyethylene and polypropylene.

The side-sealed front and rear walls and the bottom 116 form a receptacle or pouch. The side-sealed uppermost portions of the front and rear body walls form a mouth of the receptacle. The resealable package shown in FIG. 1 further comprises a header 126, which may be a wall or strip formed from the same material as that comprising the walls of the package or from the same material as that comprising the zipper or from an entirely separate material. The header 126 encloses the mouth of the receptacle and acts as a tamper-evident feature. The header may also be used to provide a means for hanging the package on a hook on a display rack, e.g., by forming a hole in the header and sliding the hole onto a hook on a display rack. The package will then depend from the hook until removed by a consumer.

The thermoplastic web material of the front wall 112 and of the header 126 may be optically transparent, in which case a flexible zipper 122 and a slider 124, located inside of the package 110, will be visible, as seen in FIG. 1. Alternatively, the slider inside a package made of opaque material and having an enclosed header may be rendered visible my providing an aperture in one or both walls of the header.

Typically the zipper 122 comprises two zipper halves that are heat sealed or bonded to the front and rear body walls respectively. Typically, one zipper half comprises an interlocking closure member (designated by numeral 128 in FIG. 1) having a male profile and the other zipper half comprises an interlocking closure member (not shown in FIG. 1) having a female profile designed to receive and interlock with the male interlocking member. Alternatively, the zipper may comprise alternating hook-shaped closure elements that interleave when the zipper halves are brought together. Each zipper half also comprises a flange or fin joined to the respective interlocking member. Typically, the flange 130 of one zipper half is sealed to the front body wall and the flange of the other zipper half (not shown in FIG. 1) is sealed to the rear wall.

The packaging depicted in FIG. 1 includes a slider 124 mounted on the zipper 122 to facilitate its opening and closing. To this end, moving the zipper slider toward one side disengages the profiled interlocking closure members of the zipper halves and moving the slider toward the opposite side brings the interlockable closure members of the zipper halves into engagement. The slider for opening or closing the reclosable zipper is typically shaped so that the slider straddles the zipper profiles. In a straddling slider, the ends of the slider are open to allow the zipper to pass through. The slider may be made in multiple parts and welded together or the parts may be constructed to be snapped together. The slider may also be of one-piece construction. The slider can be made using any desired method, such as injection molding. The slider can be molded from any suitable plastic, such as nylon, polypropylene, polystyrene, acetal, polyketone, polybutylene terephthalate, high-density polyethylene, polycarbonate, or ABS.

Figure 2:
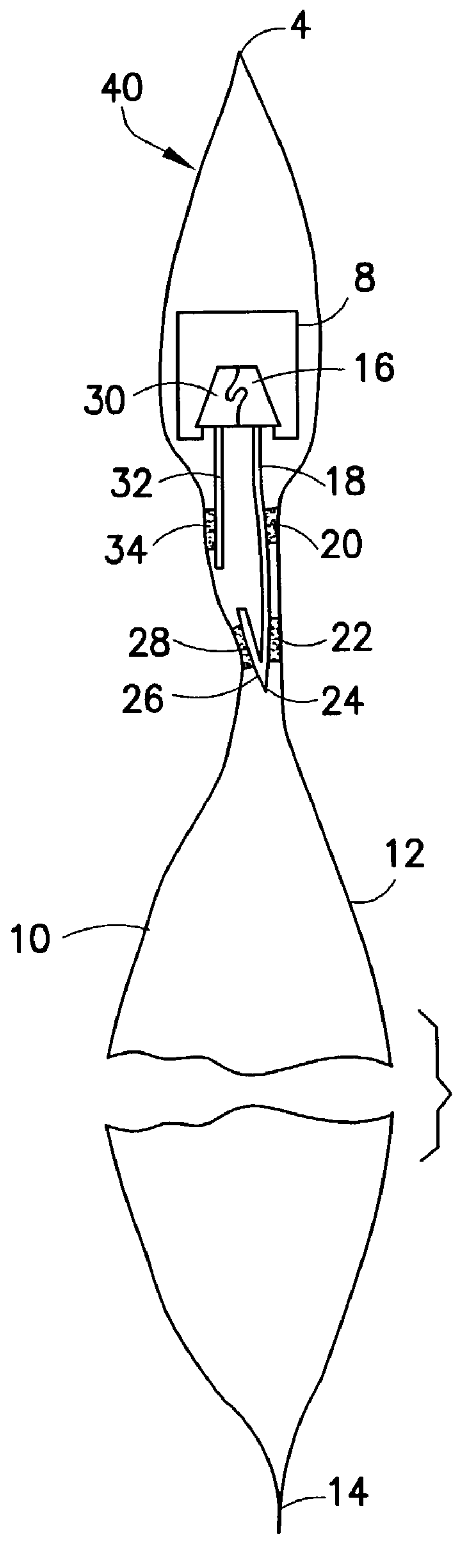
FIG. 2 is a drawing showing a sectional view of a resealable package having a split-flange zipper.

The method and apparatus disclosed herein can be employed in the manufacture of a resealable package of the type shown in FIG. 2. The bag comprises a rear wall 10 and a front wall 12 integrally connected at a fold line 4 situated at the top of the package. At the bottom of the package, the opposing edges of walls 10 and 12 are joined by a fin seal 14. Although not shown in FIG. 2, the walls 10 and 12 are also joined at the sides of the package, at least from the bottom to the slider end stops on the zipper (not shown in FIG. 2) by respective side seals.

A zipper assembly with a slider 8 is situated near the fold line 4 in the bag making film. The zipper assembly comprises first and second zipper parts that are mutually engageable to close the zipper and disengageable to open the zipper. The first zipper part comprises a profiled closure element 16 having a female profile and a long flange 18 connected to the closure element 16; the second zipper part comprises a profiled closure element 30 having a male profile and a short flange 32 connected to the closure element 30. The long and short flanges are formed by cutting a continuous web that has been extruded along with and is connected to the profiled closure members.

As seen in FIG. 2, the zipper flange 32 is secured to the bag rear wall 10 by a permanent seal 34 proximal to the top of the bag. Zipper flange 18, which is longer than flange 32, is secured to the bag front wall 10 by permanent seals 20 and 22 proximal to the bag top. Flange 18 is further secured to the bag rear wall 10 by a permanent seal 28, which is located below the seal 34. It should be appreciated that each of the seals 20, 22, 28 and 34 is a band of joined, e.g., fused, material that extends from one side seal of the bag to the other side seal, thereby securing the zipper to the bag along the width of the bag. 8. In this disclosed embodiment, the seals 20 and 22 are generally parallel to each other, and the seals 28 and are generally parallel to each other. Also, seals 20 and 34 are generally opposed to each other at one elevation, and seals 22 and 28 are generally opposed to each other at a lower elevation.

The bag walls 10 and 12 are formed of a suitable plastic film material for the product to be contained within the package. For example, the film may be a laminate or coextrusion comprising a gas barrier layer and/or a low-melting-point sealant layer. The flange 18 may be formed by lamination, coextrusion or monolayer extrusion, and may comprise a barrier layer contained within tie (or adhesive) layers and low-melting-point sealant layers. In this manner, flange 18 and bag walls 10, 12 cooperate in maintaining a barrier completely around the product to permit the hermetic sealing of the product within the package. In addition, one of the internal or external layers of flange 18 may comprise a low-melting-point material to facilitate controlling the sealing of the flange to the bag walls as required. The low-melting-point sealant layers facilitate sealing the flange to the bag walls. The barrier layer may provide resistance to moisture and/or gases such as oxygen, carbon dioxide, nitrogen and other gases from entering (or exiting) the package and permits the package to be hermetically sealed if required. The hermetic sealing of the package contents is independent of the zipper and will be maintained whether the zipper is opened or closed as long as the bag walls and flange 18 remain intact.

The portion of the folded bag making film that covers the slider-zipper assembly functions as a header 40. The functions of the header include one or both of the following: (1) providing a means for suspending the package from a hook on a display rack; and/or (2) providing evidence of tampering to the consumer before a purchase is made. The sides of the header 40 may optionally be sealed at the same time that the package side seals are formed.

As indicated in FIG. 2, the long flange 18 has a line of weakened tear resistance 24 that runs along the flange parallel to interlocking closure member 16. The terminal section 26 is that portion of flange 18 extending from the line of weakness 24 to the end of flange 18 that is sealed to wall 10. This portion will be separated from the remainder of flange 18 where the line of weakness 24 is ruptured. The line of weakness 24 may take the form of a scoreline in the flange or a line of contamination in the extruded thermoplastic material of the flange. Alternatively, the line of weakening may comprise a line of perforations (not shown in FIG. 2) extending along the flange 34. To maintain the barrier of flange 34, the line of perforations is capped by a frangible strip (not shown in FIG. 2) of lightweight material, as disclosed in U.S. Pat. No. 5,023,122. This frangible strip seals the perforations, but tears readily when the perforated flange is ruptured along the perforations. The sealing strip may be heat sealed to the perforated flange or the sealing strip may be adhesive backed to allow the strip to be bonded to the flange by adhesive. Alternatively, the sealing strip may be provided by extruding a thin layer of material over the perforations.

After the header is removed and the zipper is initially opened by a consumer, the flange 18 still prevents access to the package contents. The intact flange 18 provides hermetic sealing. By bearing down on the flange 18 or simply separating the top ends of the bag, the line of weakness 24 can be ruptured, thereby providing access to the contents.

The method of manufacturing the resealable package depicted in FIG. 2 will now be described with reference to FIGS. 3–9. In the first stage of manufacture depicted in FIG. 3, a web of bag making film 2 is unwound from a roll and fed in a machine direction toward a horizontal form-fill-seal machine (not shown). The direction of web advancement is indicated by the arrow in FIG. 3. The web may be advanced one package increment or width at regular intervals of time.

Figure 3:
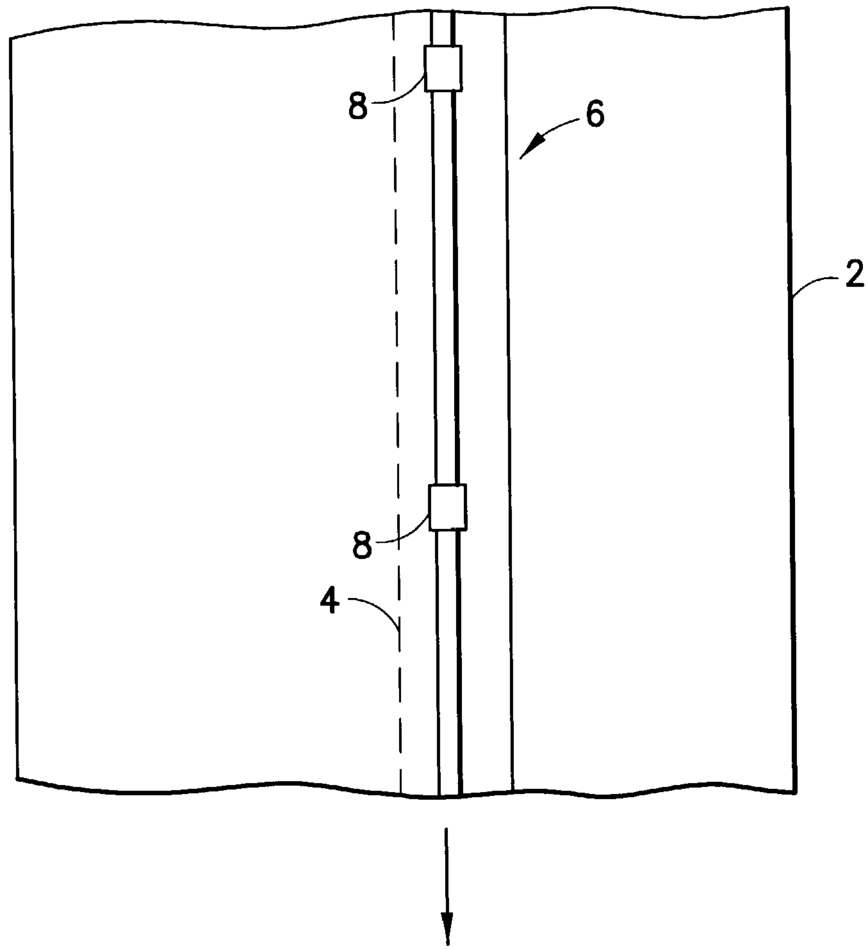
FIG. 3 is a drawing showing a split-flange zipper tape with inserted sliders placed on a web of bag making film in accordance with one method of manufacturing the embodiment depicted in FIG. 2.

A zipper tape 6 with sliders 8 inserted at spaced intervals therealong is guided to a position offset from the center of the web, indicated by dashed line 4, the zipper tape being disposed parallel to the centerline 4. As will be explained below, the dashed line 4 in FIG. 3 is the location where the web 2 is folded. The slider-zipper assembly may be fed directly from a slider insertion machine or may be unwound from a spool of zipper tape having sliders pre-inserted thereon. As can be seen in FIG. 3, the zipper flanges are directed away from the centerline 4, with the zipper closure members being between the flanges and the web centerline.

While in the position shown in FIG. 3, the long flange 18 is joined to the bag making film by two-point heat sealing. This may be accomplished, for example, by pressing contacting portions of the zipper flange 18 and the bag making film between a heated sealing jaw 36 having two parallel spaced sealing bars and an opposing unheated sealing jaw or bed (not shown). Both jaws are retractable to allow intermittent sealing during the intervals when the web and zipper tape are not being advanced. The two bars of sealing jaw 36 are respectively positioned to form a band of heat sealing (permanent seal 34) between the short flange 32 and the bag making film 2 and a band of heat sealing (permanent seal 28) between the terminal section 26 of long flange 18 and the bag making film 2. The unheated jaw or bed (not shown) is pressed against flange 18 from above, while heated sealing jaw 36 is pressed against the bottom of the web of bag making film from below. The conditions of heat conduction are adjusted so that the flanges 18 and 32 are not sealed or tacked to each other. In accordance with this heat sealing arrangement, it is not necessary to form the flanges as laminates with mutually opposing high-melting-point non-sealant layers.

After the first heat sealing operation, the web of bag making film is folded over the zipper assembly at fold line 4 (see FIG. 3) by conventional means, e.g., a folding board or plow. During folding, the two halves of a horizontally disposed web of bag making film are turned upward 90 degrees, toward a vertical center plane. While the folded web is in a generally vertical orientation at a second sealing station, the other side of the split zipper web is two-point sealed to the bag making film.

Figure 5:
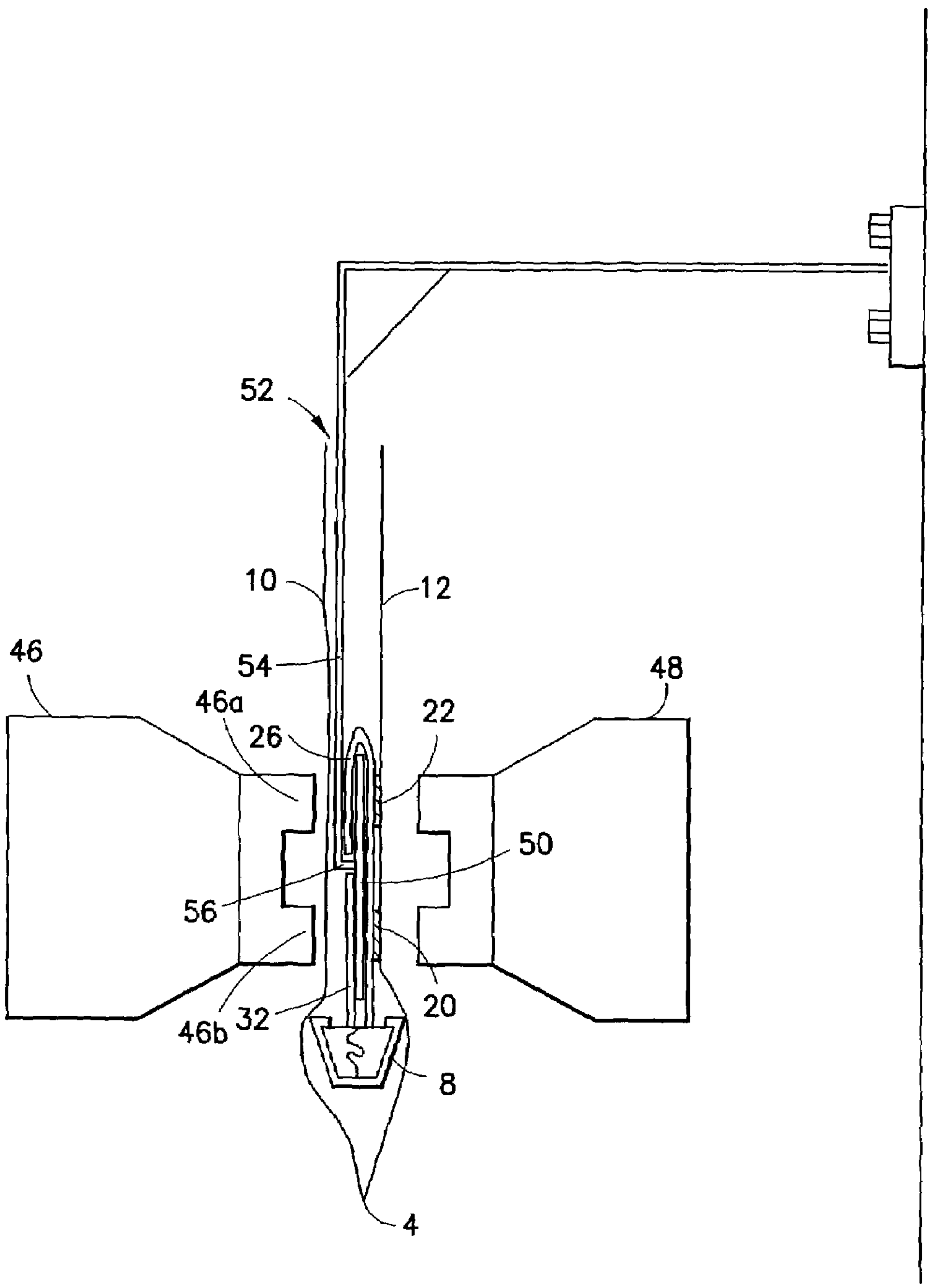
FIG. 5 is drawing showing an end view of a sealing station in accordance with one embodiment of the present invention.

Referring now to FIG. 5, at the second sealing station the folded film is vertically oriented with the fold at the bottom and the open end at the top. The flange portions 26 and 32 on the split side of the zipper web are sealed at respective points by pressing the split zipper web and the adjacent film layers 10 and 12 between a pair of sealing jaws 46 and 48, which are movable between extended and retracted positions. The flanges and film are pressed together when the sealing jaws are extended. The zipper tape and web of bag making film are advanced while the sealing jaws are retracted. When the sealing jaws are extended, sealing jaw 46 is heated, while sealing jaw 48 is unheated. FIG. 5 shows the sealing jaws 46 and 48 in their respective retracted positions. Alternatively, an unheated retractable bed could be substituted for the unheated sealing jaw 48.

Figure 10:
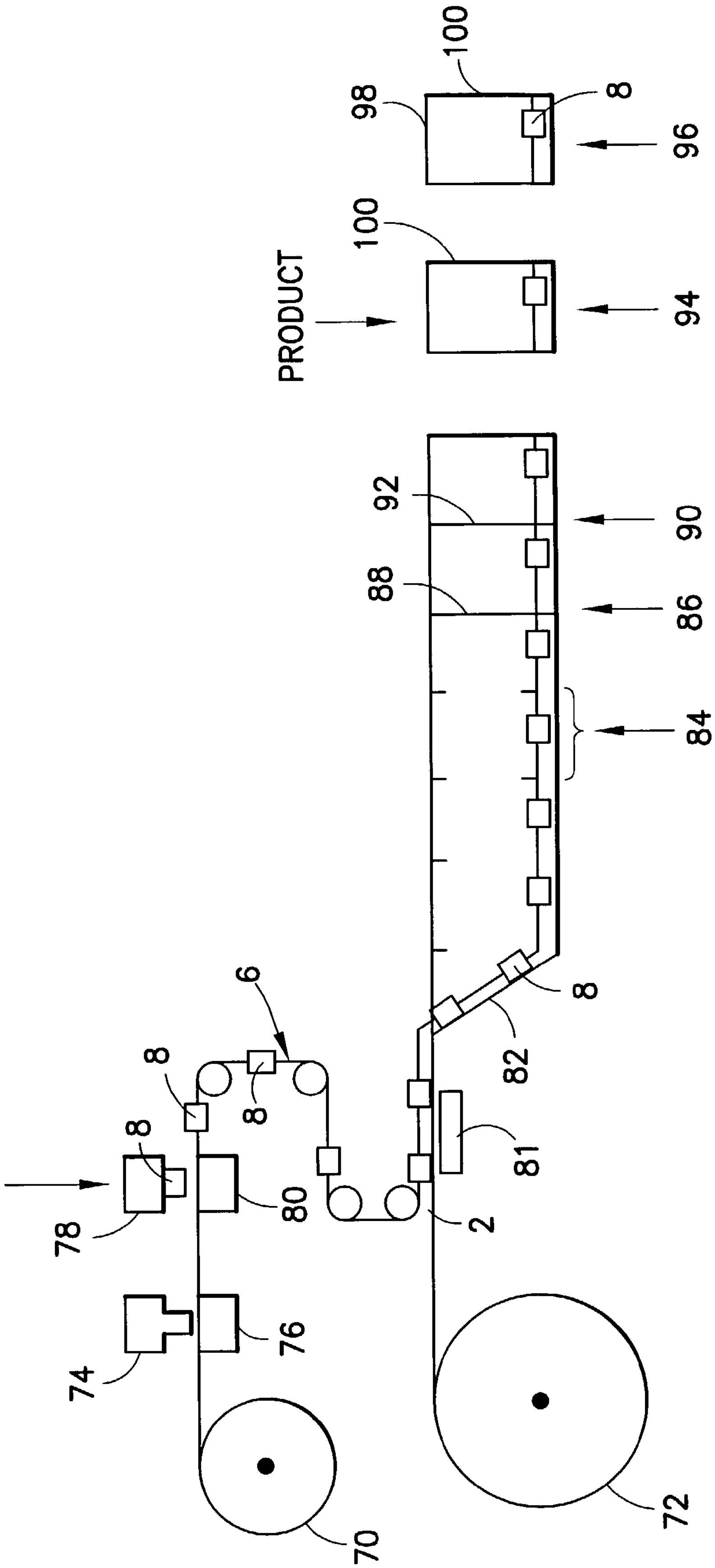
FIG. 10 is a schematic showing an HFVFS machine in which the disclosed embodiment of the present invention can be incorporated.

As seen in FIG. 10, the second sealing operation at station 84 is separated from the first sealing operation at station 81 only by the folding operation (folding board 82 in FIG. 10). Thus the zipper flanges, which were heated during the first sealing operation, have little time to cool before the second sealing operation occurs. During continuous operation, the result could be a rise in temperature of the zipper flanges at the second sealing station sufficient to cause the opposing flange portions to join or tack together. To overcome this problem, the method of the present invention substantially thermally isolates opposing flange portions from each other at the second sealing station, to prevent joining or tacking together of the opposing flange portions.

Referring again to FIG. 5, the thermal isolation of the flanges is accomplished by inserting a separator blade 50 disposed generally vertically between the opposing flange portions and then sealing flange portions 26 and 32 to wall 10 of the film, while the flange portion 18 is thermally isolated from flange portions 26 and 32 by the separator blade 50. As seen in FIG. 5, the separator blade 50 is connected to the end of a flange 56 that penetrates the longitudinal gap between the opposing distal edges of the zipper flange portions 26 and 32. The flange 56 is in turn connected to a terminal section of a mounting plate 54, which is adjustably mounted to a rigid support structure 52. The rigid support structure may in turn be mounted to a support frame of a horizontal form, vertical fill-seal (HFVFS) machine of the type generally depicted in FIG. 10 (which will be described in more detail hereinafter). The mounting plate 54 is disposed in a generally vertical plane, substantially in parallel with the plane of the separator blade 50.

Figure 7:
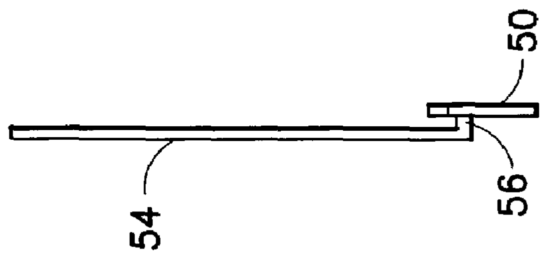
FIGS. 6 and 7 are drawings showing side and end views, respectively, of a separator blade and supporting structure in accordance with the disclosed embodiment of the present invention.
Figure 6:
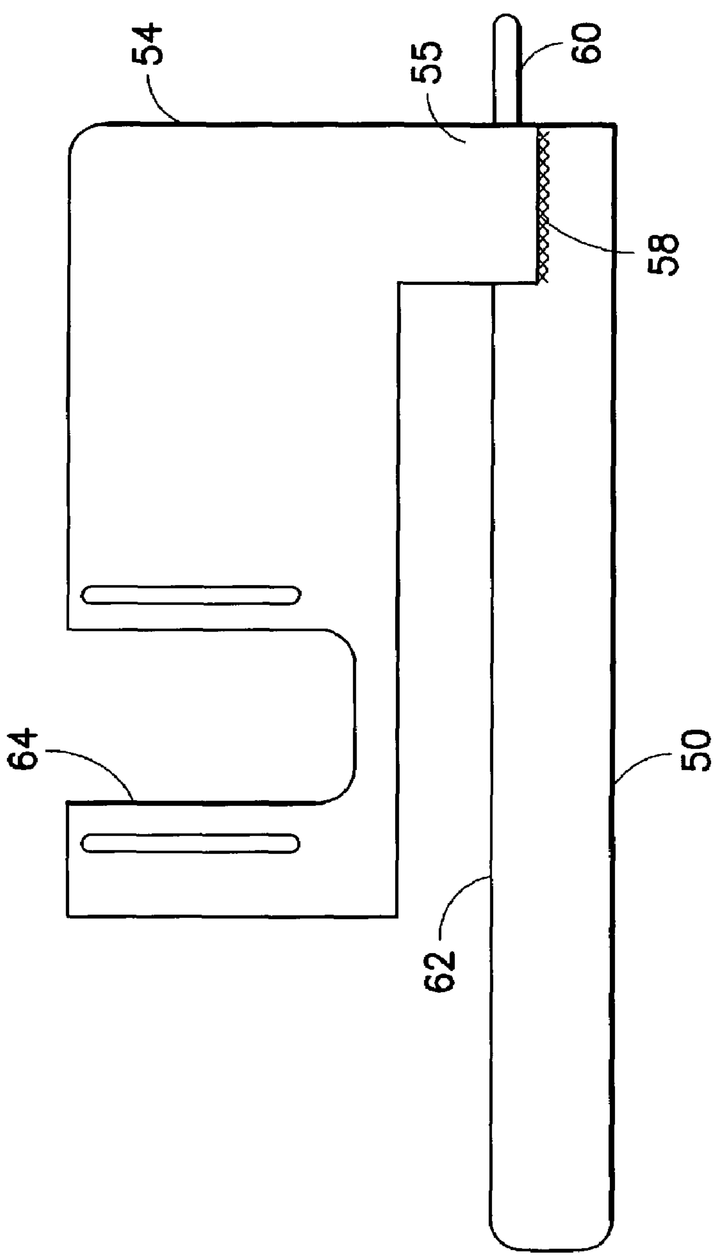

The structure of the separator blade 50 and the mounting plate 54 are shown in detail in FIGS. 6 and 7. The mounting plate is a generally planar structure having a wide recess 64 and a pair of narrow slots on opposing sides of recess 64 to facilitate adjustable mounting of the mounting plate 54 to a support (not shown). A tongue-shaped terminal section 55 of the mounting plate has a flange 56 at its distal edge. Flange 56 projects to one side of the mounting plate in a direction generally perpendicular to the plane of the mounting plate. The separator blade comprises an end section that is welded to the end of the flange 56. The weld is indicated by reference numeral 58 in FIG. 6. The separator blade 50 also has a generally planar plate-like structure and, as best seen in FIG. 7, is generally parallel with the mounting plate 54. The separator blade 50 further comprises a cantilevered section (best seen in FIG. 6) that projects in a longitudinal direction corresponding to the direction of zipper tape/bag making film advancement (from right to left in FIG. 6). The height of the separator blade 50 is constant along its length, except for the rounded corners at its distal end and the prong 60 at the opposite end of the separator blade. The top edge 62 of the separator blade is straight and disposed horizontally in the arrangement depicted in FIG. 5.

During the second sealing operation, the cantilevered section of the separator blade 50 separates and thereby substantially thermally isolates flange portion 18 from flange portions 26 and 32, as seen in FIG. 5. The sealing jaws 46 and 48, when extended, will press the zipper flange portions against the sides of the cantilevered section of the separator plate, with the bag making film intervening between the sealing bars and the zipper flanges. On the side of the heated sealing jaw 46, the upper heated sealing bar 46*a* will seal the wall 10 to the flange portion 26 (thereby forming the permanent seal 28 shown in FIG. 2) and the lower heated sealing bar 46*b* will seal the wall 10 to the flange portion 32 (thereby forming the permanent seal 34 shown in FIG. 2). On the side of the unheated sealing jaw 48, no sealing occurs (permanent seals 20 and 22 were previously formed in the first sealing operation).

It should be appreciated that upstream of the second sealing station, the bag making film with attached zipper tape is able to advance without interference from the structure supporting the separator plate, namely, the mounting plate 54 and the flange 56 (see FIG. 5) because the zipper tape is not yet joined to wall 10, thus allowing the mounting plate 56 to occupy a position between the advancing film and zipper tape. Similarly, the flange 56 penetrates through the longitudinal gap between the distal edges of flange portions 26 and 32, and is disposed in parallel with the direction of tape advancement, so that as the tape advances, the longitudinal gap between the split flanges provides clearance for the stationary flange. Once a section of zipper tape passes the flange 56 and lies adjacent to the cantilevered section, which projects forward free of supporting structure other than at the base of the cantilever, the split side of the zipper web can be joined to the wall 10 and advanced without interference from the mounting plate or flange, which are located upstream of the second sealing station.

Figure 8:
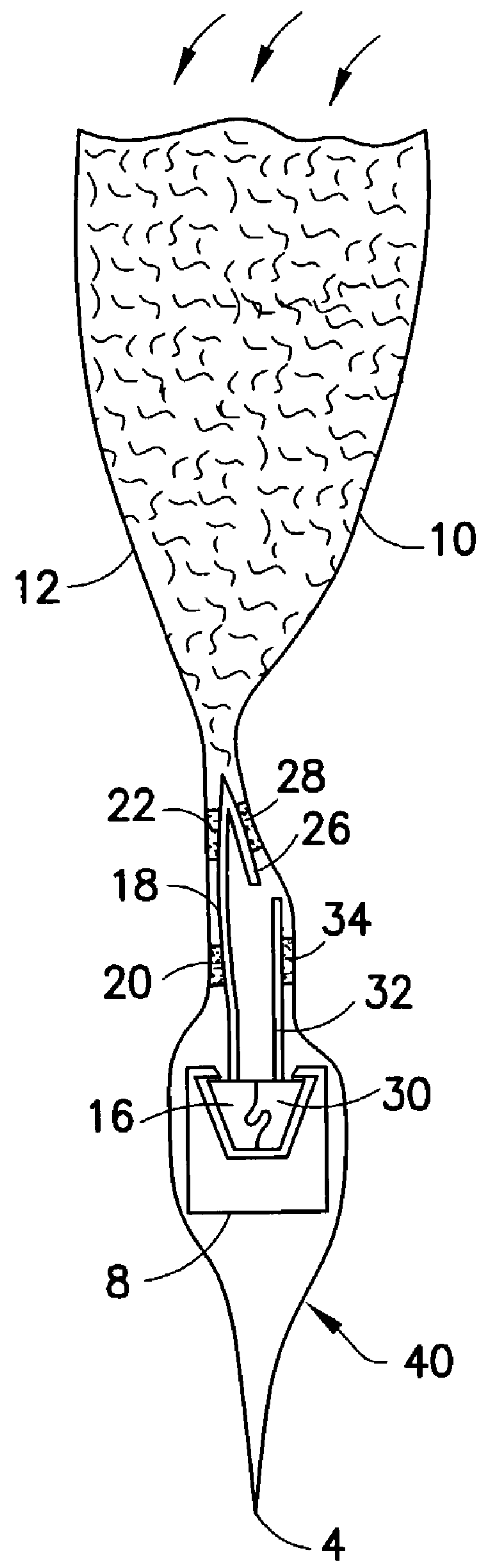
FIG. 8 is a drawing showing the resealable package being bottom-filled with product after the long zipper flange of the slider-zipper assembly has been two-point sealed to the folded-over portion of the web of bag making film.

At this juncture in the manufacturing process, the slider-zipper assembly is sealed inside a folded web, proximal to the fold, with the folded web upside-down in an upright position with the fold (i.e., the top of the package) at the bottom. The upside-down folded web is cross heat sealed after each advancement of web to form a respective package side seal. The vertical sealing bars (not shown) that make the cross seal may extend to the top of the header, to seal the ends of the header closed, or the sealing bars may stop at the zipper, leaving the ends of the header open. Each pair of successive cross seals produces a receptacle that is open at the top of the folded web of bag making film. The bottom of this receptacle (corresponding to the top of the completed package) is closed by the long zipper flange, which is joined to both walls. The resulting receptacle is filled through its open top (which corresponds to the bottom of the completed package). In this sense, one can say that the zippered packages of the invention are filled from the bottom. Such filling is depicted in FIG. 8. After the package has been filled, the bottom of the package can be heat sealed in conventional fashion. Then the bag making film is cut along a side seal to separate the filled package from the web of bag making film.

By placing and sealing the slider-zipper assembly near the folding line of the web of bag making film, packagers of consumer products can avoid the process of filling product "behind" or "around" the zipper profiles, which can lead to product contamination on the zipper flanges, resulting in poor seal quality of the finished package.

Figure 9:
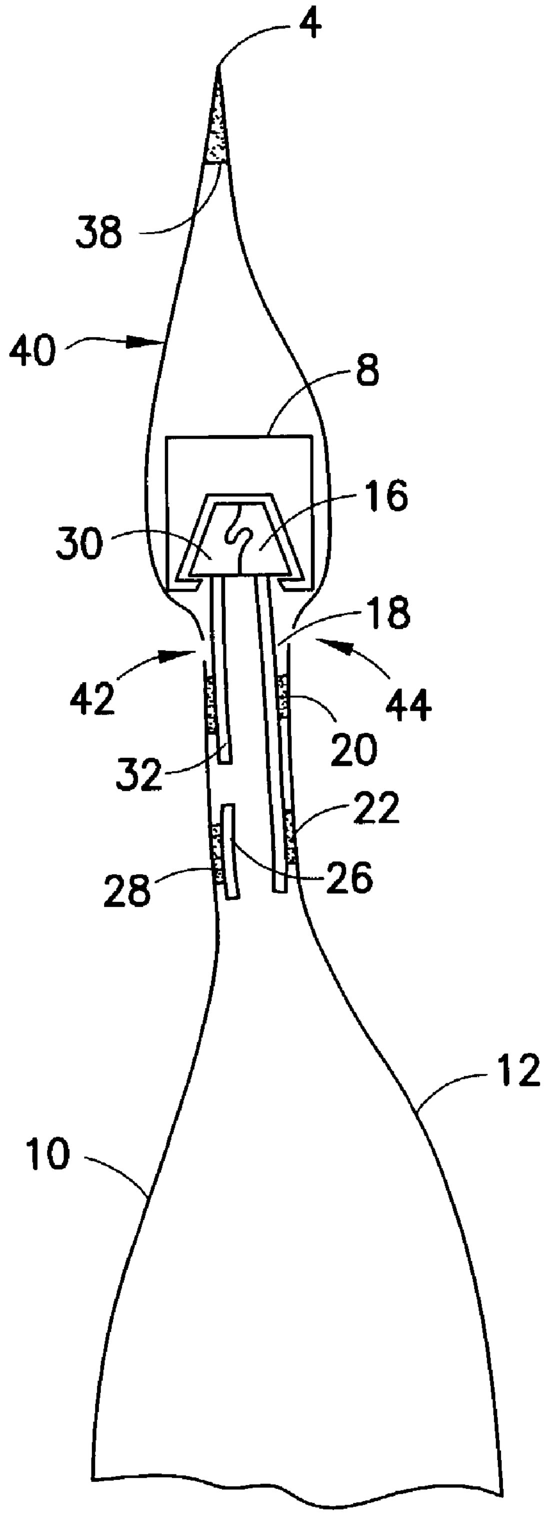
FIG. 9 is a drawing showing the areas where material in the resealable package must be ruptured or torn before the consumer can access the contents of the package.

To open the above-described package, the consumer must first remove the header, then operate the slider to open the zipper, and finally, rupture the long zipper flange along its line of weakness. To facilitate removal of the header, a reinforced section 38 (shown in FIG. 9) can be formed at the tip of the header by joining the walls 10 and 12 together, e.g., by heat sealing, in the region adjacent the fold line 4. This heat-sealed reinforced region can be easily gripped by the consumer to tear off the header 40. Tearing off of the header 40 is facilitated by providing respective lines of weakened tear resistance, designated 42 and 44 in FIG. 9. Wall 10 has a line 42 of weakened tear resistance located between the zipper closure element 30 and the seal 34, while wall 12 has a line 44 of weakened tear resistance located between the zipper closure element 16 and the seal 20. Each line of weakening may consist of a line of spaced perforations, for example. After the header 40 has been torn away, the slider is moved in the opening direction to open the zipper. Then the consumer can reach in and rupture the long flange at the cusp of the V. FIG. 9 shows both the header separated from the package but not yet removed and the long flange ruptured, leaving the terminal section 26 of the long flange 18 attached to the wall 10, while the remainder of flange 18 is attached to the wall 12. Because the lowermost section of the ruptured long flange 18 is sealed to the wall 12 at seal 22, product inside the package cannot become trapped behind the flange 18 when the package is turned upside-down and product is dispensed.

FIG. 9 shows the areas where material in the resealable package must be ruptured or torn before the consumer can access the contents of the package. For the sake of economy, the rupture in the long zipper flange and the tears separating the header from the remainder of the package are all depicted in this single drawing, although a person skilled in the art will appreciate that the situation depicted would never occur in practice, since before the long flange could be ruptured, the header must already have been removed and the slider-operated zipper opened.

The zipper may be designed for slider-less operation, in which case pull flanges may be provided, extending upward from the interlockable profiled closure members.

An HFVFS machine incorporating the present invention at sealing station 84 is generally depicted in FIG. 10. A split-flange zipper tape 6 is paid out from a spool 70 and then ultrasonically crushed at zipper length intervals between an ultrasonic horn 74 and an anvil 76 to join the zipper ends and form slider end stops. At the next station, a slider insertion device 78 inserts sliders 8 onto the zipper tape (one per zipper length), the latter being supported by a zipper guide 80.

Figure 4:
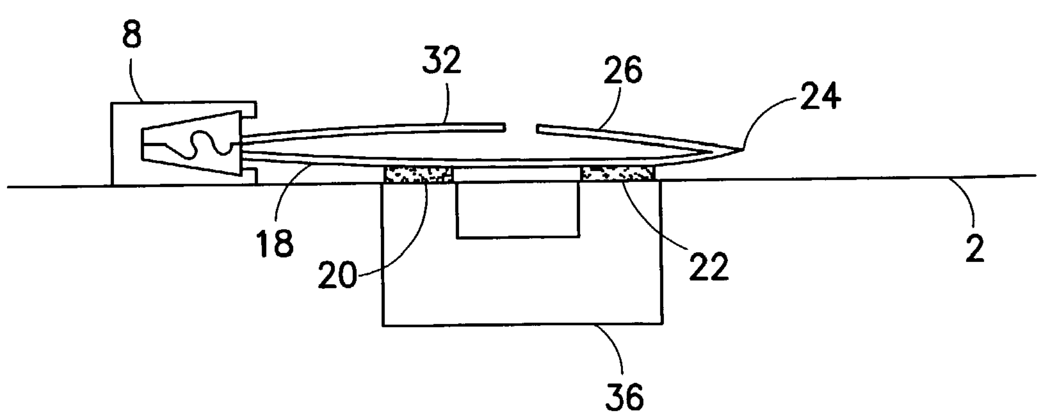
FIG. 4 is a drawing showing another step of the method of manufacture, the slider-zipper assembly being sealed at two points to the not-yet-folded bag making film after the placement step shown in FIG. 3.

A web of laser-scored bag making film 2 is paid out from a roll 72 and pulled forward in a horizontal position under tension to a first sealing station 81. (The laser scoring lies along parallel lines on opposing sides of the upcoming fold line and will later form the lines of weakness 42 and 44 seen in FIG. 9.) At the same time, the split-flange zipper tape with inserted sliders is guided to a position overlying the film 2 and oriented in the machine direction (as seen in FIG. 3). The unsplit side of the zipper flanges is heat sealed to the film (as seen in FIG. 4). Then the web of bag making film with attached zipper tape is advanced to a folding board 82, which folds the web of bag making film, the folded web being reoriented to a vertical position with the zipper tape sandwiched between the opposing sides of the folded web proximal to the fold. At a second sealing station 84, the zipper flanges on the split side of the zipper tape are heat sealed to the opposing wall of film using the arrangement shown in FIG. 5.

The web of bag making film is intermittently advanced one package width at a time, as is well known in the art. Following the second sealing operation, the web is cross sealed at station 86 to form a side seal 88 and then is cut at cutting station 90 by a knife along a cut line 92 that generally bisects the previously formed side seal. The cutting operation separates a package 100 from the web 2. The separated package 100 is filled with product (in the manner depicted in FIG. 8) at filling station 94. The opposing edges of the open bottom of the package are then heat sealed at station 96 to form a bottom seal 98.

While the invention has been described with reference to preferred embodiments, it will be understood by those skilled in the art that various changes may be made and equivalents may be substituted for members thereof without departing from the scope of the invention. In addition, many modifications may be made to adapt a particular situation to the teachings of the invention without departing from the essential scope thereof. Therefore it is intended that the invention not be limited to the particular embodiment disclosed as the best mode contemplated for carrying out this invention, but that the invention will include all embodiments falling within the scope of the appended claims.

As used in the claims, the verb "joined" means fused, bonded, sealed, or adhered, whether by application of heat and/or pressure, application of ultrasonic energy, application of a layer of adhesive material or bonding agent, interposition of an adhesive or bonding strip, etc.

What is claimed is:

1. An apparatus for sealing an inverted zipper tape to a generally vertical section of a web of bag making film, said zipper tape comprising a first profiled closure element, a first zipper flange connected to said first closure member and having a distal edge, a second profiled closure element that is interlockable with said first closure element, and a second zipper flange connected to said second closure element, folded at a cusp, and having a distal edge confronting and separated by a gap from said distal edge of said first zipper flange, said apparatus comprising:

a generally vertical mounting plate comprising a terminal section disposed between said vertical section of said web and an adjacent section of said zipper tape;

a generally horizontal flange connected to said terminal section of said mounting plate and projecting through said gap;

a generally vertical separator blade comprising an end section connected to said flange and a cantilevered section projecting in a longitudinal direction, said separator blade comprising a lower portion that separates said first zipper flange from an opposing portion of said second zipper flange and an upper portion that separates mutually opposing portions of said second zipper flange from each other; and first and second jaws disposed on opposing sides of said cantilevered section of said separator blade and movable between respective extended and retracted positions, said zipper tape and said web of bag making film being pressed together when said first and second jaws are in said extended positions.

2. The apparatus as recited in claim 1, wherein said cantilevered section of said separator blade has a length equal to about one package width.

3. The apparatus as recited in claim 1, wherein said first jaw comprises first and second bars, said first and second bars projecting toward said second jaw and extending generally longitudinally.

4. The apparatus as recited in claim 3, wherein each of said first and second bars is heated when said first and second jaws are in said extended positions.

5. The apparatus as recited in claim 1, wherein said first jaw is heated and said second jaw is not heated when said first and second jaws are in said extended positions.

6. The apparatus as recited in claim 1, wherein said cantilevered section of said separator blade has a generally horizontal straight top edge.

7. The apparatus as recited in claim 1, wherein said cantilevered section has a constant height along said longitudinal direction that is slightly less than the distance separating said cusp from said second closure member.

8. The apparatus as recited in claim 1, further comprising a weld that connects said separator blade to an end of said flange.

9. An apparatus for in-line sealing of zipper tape to film comprising:

first and second jaws disposed on opposing sides of a vertical plane and movable between respective extended and retracted positions;

a generally vertical mounting plate disposed generally parallel to said vertical plane, said mounting plate having a terminal section;

a generally horizontal flange connected to said terminal section of said mounting plate and projecting on one side of said mounting plate; and a generally vertical separator blade disposed generally parallel to said vertical plane, and comprising an end section connected to said flange and a cantilevered section connected to said end section and projecting in a direction of zipper tape/web advancement, said separator blade having a top edge at a first height and a bottom edge at a second height, wherein said first height is above a height of said flange and said second height is below said height of said flange, wherein said first and second jaws confront opposing sides of said cantilevered section of said separator blade.

10. The apparatus as recited in claim 9, wherein said cantilevered section of said separator blade has a length equal to about one package width.

11. The apparatus as recited in claim 9, wherein said first jaw comprises first and second bars, said first and second bars projecting toward said second jaw and extending generally parallel to said cantilevered section of said separator blade.

12. The apparatus as recited in claim 11, wherein each of said first and second bars is heated when said first and second jaws are in said extended positions.

13. The apparatus as recited in claim 9, wherein said first jaw is heated and said second jaw is not heated when said first and second jaws are in said extended positions.

14. The apparatus as recited in claim 9, further comprising a weld that connects said separator blade to an end of said flange.

15. A machine for in-line manufacture of resealable packages, comprising:

means for placing a split-flange zipper tape in contact with a web of bag making film in a predetermined position parallel and proximal to a line where said web of bag making film will be folded, said split-flange zipper tape comprising a folded and cut zipper web that connects interlocked closure members of said zipper tape, one side of said zipper web having a longitudinal gap and the other side of said zipper web having no longitudinal gap, the latter contacting said web of bag making film;

means for sealing the side of said zipper web having no longitudinal gap to said web of bag making film in a first longitudinal zone of joinder while said zipper tape is in said predetermined position;

means for folding said web of bag making film along said line until said zipper tape is sandwiched between opposing first and second portions of said web of bag making film, said zipper tape being sealed to only said first portion of said web of bag making film at this juncture;

means for substantially thermally isolating the side of said zipper web having said longitudinal gap from the side of said zipper web having no longitudinal gap;

means for sealing the side of said zipper web having said longitudinal gap to said second portion of said web of bag making film in a second longitudinal zone of joinder while the side of said zipper web having no longitudinal gap is substantially thermally isolated therefrom;

means for sealing said web of bag making film along first and second transverse zones of joinder; and means for cutting said web of bag making film and said zipper tape along transverse lines in said first and second transverse zones of joinder respectively.

16. The machine as recited in claim 15, wherein said thermal isolation means comprise a stationary blade.

17. The machine as recited in claim 16, further comprising a support structure comprising a terminal section that is connected to said blade, wherein said terminal section passes through said longitudinal gap in said zipper web.

* * * * *